(12) United States Patent
Battlogg

(10) Patent No.: US 6,440,029 B1
(45) Date of Patent: Aug. 27, 2002

(54) ELECTRICALLY ASSISTED STEERING BOOSTER WITH A COMPACT PLANETARY GEAR

(75) Inventor: Stefan Battlogg, St. Anton Im Montafon (AT)

(73) Assignee: Krupp Presta AG, Eschen (LI)

( * ) Notice: Subject to any disclaimer, the term of this patent is extended or adjusted under 35 U.S.C. 154(b) by 0 days.

(21) Appl. No.: 09/762,967
(22) PCT Filed: Jul. 29, 1999
(86) PCT No.: PCT/CH99/00356
§ 371 (c)(1), (2), (4) Date: Feb. 15, 2001
(87) PCT Pub. No.: WO00/09382
PCT Pub. Date: Feb. 24, 2000

(30) Foreign Application Priority Data

Aug. 15, 1998 (CH) ............................................ 1683/98

(51) Int. Cl.[7] .............................................. F16H 48/06
(52) U.S. Cl. ...................................................... 475/149
(58) Field of Search .................................. 475/149, 151

(56) References Cited

U.S. PATENT DOCUMENTS

| | | | | |
|---|---|---|---|---|
| 4,530,413 A | * | 7/1985 | Buike et al. ............... | 180/79.1 |
| 4,629,024 A | * | 12/1986 | Buike et al. ............... | 180/79.1 |
| 5,145,021 A | * | 9/1992 | Nakamura et al. ......... | 180/79.1 |
| 5,906,250 A | * | 5/1999 | Haga et al. ................. | 180/444 |
| 5,927,428 A | * | 7/1999 | Nagao et al. ............... | 180/444 |
| 6,026,925 A | * | 2/2000 | Nagao et al. ............... | 180/444 |
| 6,029,768 A | * | 2/2000 | Kiyosawa ................... | 180/444 |

* cited by examiner

*Primary Examiner*—Dirk Wright
(74) *Attorney, Agent, or Firm*—Notaro & Michalos PC

(57) ABSTRACT

A steering booster configuration for motor vehicles has a shaft rotatable about a longitudinal axis. An electric disk armature motor with a coaxially disposed planetary gearing is connected to the shaft for stepping up the motor power. The motor has a rotor disk which is supported on the shaft, and is offset parallel with respect to the axis. A hollow toothed gear is fastened to the rotor and wobbles about the axis.

7 Claims, 2 Drawing Sheets

ELECTRICALLY ASSISTED STEERING BOOSTER WITH A COMPACT PLANETARY GEAR

Figure 1:
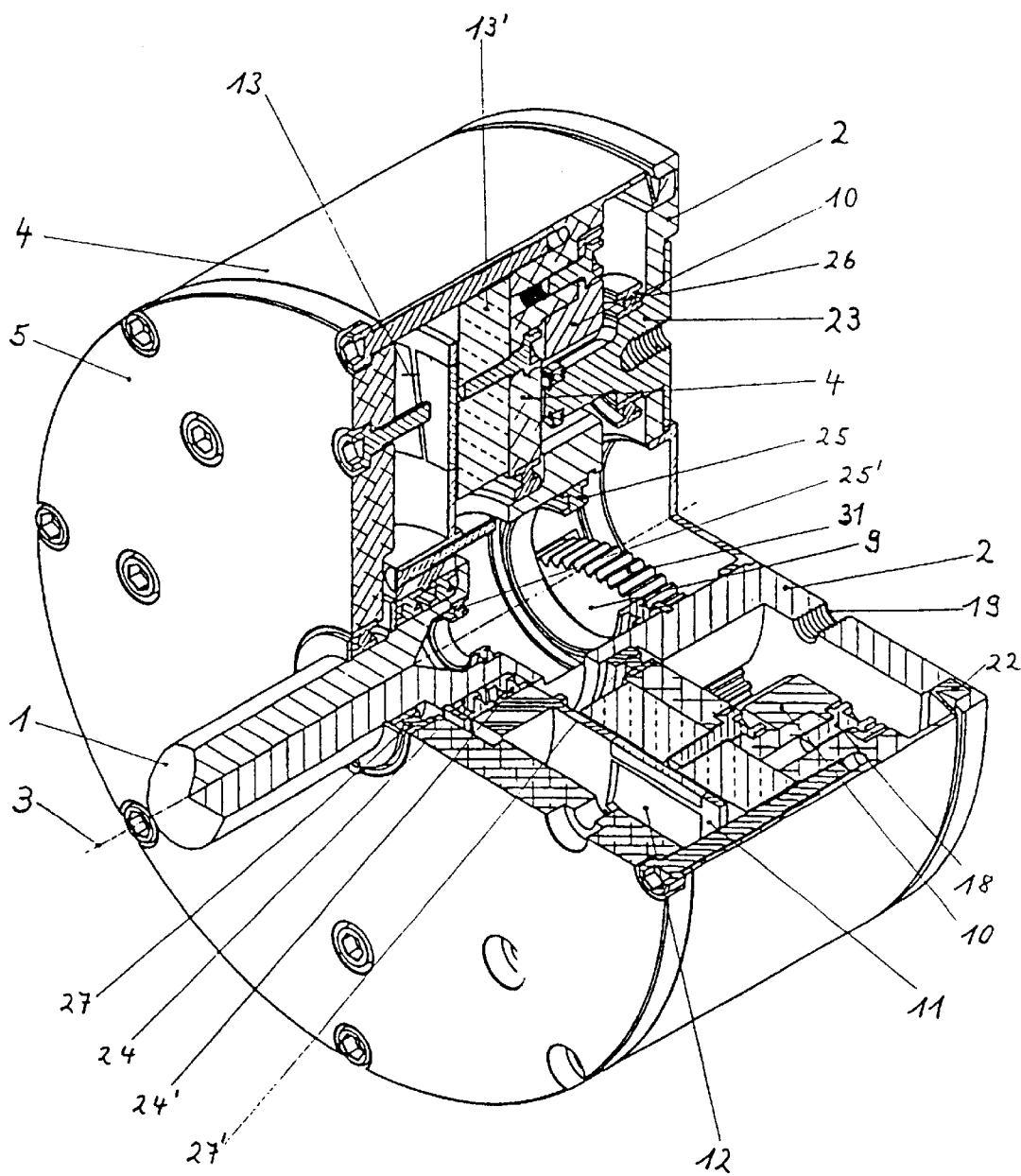

The invention relates to a steering booster configuration according to the preamble of claim 1.

EP 0 124 790 discloses a steering booster with electric drive which is installed coaxially in the steering shaft. Coupling-in of the servo power takes place with the aid of a servo motor which acts via a planetary gearing onto the steering shaft. The gearing and the motor are disposed coaxially with respect to the steering shaft, wherein the steering shaft is guided centrally through the configuration. Since motor and gearing are implemented as a separate assembled unit, the configuration becomes voluminous and comprises a large number of parts disadvantageously affecting economy and reliability. A particular disadvantage comprises that the sun gear of the planetary gearing is fastened on the rotor of the motor drive, wherein the rotor and the sun gear are disposed and rotatably supported coaxially with respect to the shaft axis. It is evident that in this implementation the sun gear always has a relatively large diameter, but can, at least, never have a smaller diameter than the steering shaft itself. Since the reduction ratio of a planetary gearing in the first step is determined by the ratio of the diameters of the sun gear and the planetary gears, it is readily evident that in this implementation large diameter ratios of the gears cannot be attained since in this structuring the sun gear itself always has a relatively large diameter. In the description of the above cited application a reduction ratio of 1:1 to 1:10 is specified. Greater reduction ratios would only be possible in the present embodiment if the overall gearing diameter were to be increased drastically, which would lead to unacceptable dimensions of the steering booster configuration.

Small gearing reduction ratios, in addition, have the disadvantage that the motor power must be correspondingly high and, furthermore, only slowly rotating motors can be employed which would demand corresponding expenditures. A further disadvantage herein is the less rapid response behavior which leads to reaction inertia in the system.

Due to the voluminous structuring less constructional space is available especially in the direction of the shaft axis, which primarily has a negative effect on the safety functions. In the event of an impact of the driver of the motor vehicle on the steering wheel, the energy must be absorbed as advantageously as is feasible in order for the motor vehicle driver not to be injured. This is attained in such a case thereby that the steering spindle is to yield by telescoping such that energy is absorbed in the course of telescoping. Thereon is based the requirement of making available sliding paths of greatest feasible length for the energy absorption device, which is not readily possible with servo drives known in prior art. The required large installation space in the axial direction thus comes at the expense of the desired energy absorption displacement path in the event of an impact.

A further disadvantage in known devices is that, due to the complicated structure, apart from mechanical play, they also have a certain reaction inertia as a result of moving large masses, which has a negative effect on the steering behavior and the economy. Complex [and demanding] structuring according to the known configurations, moreover, have the disadvantage of high energy consumption during operation. Apart from the requirements of economy for the provision of the requisite energy, additional expenditures are necessary in order to dissipate the corresponding heat losses.

It is the task of the present invention to eliminate the disadvantages of the above cited prior art. The task in particular comprises realizing an electric steering booster for a steering configuration which is constructed extremely compactly and which permits attaining rapid response behavior with good dynamics entailing responsive steering behavior for the driver, which operates at a high degree of efficiency and can be produced economically.

According to the invention the task is solved through the configuration according to the characterizing clause of claim 1. The dependent claims define further advantageous embodiments.

The task is solved according to the invention thereby that a disk-form electromotor is combined with a planetary gearing and both are installed in the shaft of a steering spindle, a steering shaft or a steering gearing pin, wherein the shaft in the region of installation of the drive unit is correspondingly interrupted along the steering shaft axis, or the steering shaft in this region encompasses an intermediate gear shaft which includes the sun gear of the planetary gearing. Since it is disposed in the steering shaft axis, the intermediate gear shaft can include a sun gear which is disposed in the steering shaft axis and rotates about the latter and allows very small diameters. The sun gear diameter in this design according to the invention is only limited by the required mechanical strengths. The sun gear diameter can in any case be only slightly greater, such as maximally the 1.25-fold of the steering shaft diameter. In order to attain especially high reduction ratios, the diameter can be of equal size or preferably smaller than that of the steering shaft itself. Very good ratios are attained if the sun gear diameter is in the range from 10 to 20 mm.

The configuration thus permits compact disk-form motor-gearing combinations which allow high reduction ratios. The disk-form motor-gearing configuration can herein preferably have a diameter of <200 mm, preferably <170 mm, with axial longitudinal extensions which are less than 90 mm, wherein reduction ratios from 1:10 to 1:40 are possible. The reduction ratios are preferably selected to be >1:20, wherein reduction ratios of >1:30 are even more favorable. The large reduction ratios lead to the fact that compact, economically operating, electronic disk armatures can be applied. Such disk armature motors comprise a disk-form rotor which comprises permanent magnets and is operated laterally to the disk face, preferably bilaterally, by electronically controlled stator windings. In order to be able to drive freely said intermediate shaft supported in the shaft axis, the intermediate shaft in the projecting region of the steering shaft is supported centrally rotatable and is driven by the rotor disk which comprises a hollow toothed gear and is coupled with a further gear rim of the intermediate shaft.

In order to be able to couple the motor power via the rotor onto the intermediate shaft, it is necessary to operate the rotor axis such that it wobbles slightly by a few millimeters, for example 3 mm, offset parallel with respect to the shaft axis during the rotation of the steering wheel. For this purpose the rotor is rotatably supported offset radially on the shaft axis, such that the hollow toothed gear of the rotor meshes only on one side with the gear rim of the intermediate gear. Since the stator winding is disposed stationarily in the housing configuration, the rotor in this configuration completes a movement wobbling in the radial direction by a few millimeters when the steering shaft is rotated and, driven simultaneously, rotates about the offset axis. This wobbling movement has the further advantage that the step-like movements, occurring in the case of disk armature motors which are commutated electronically, referred to as ripples, can be attenuated or compensated. Consequently, the power transmission in servo operation onto the steering wheel shaft is continuous and the undesirable ripple, or the rattle undesirable for reasons of safety, are absent. In order to keep further the overall diameter small, advantageously only two planetary gears meshing with the sun gear are employed. The planetary gears are rotatably supported in the driven-side projection of the steering shaft and comprise in the direction of their axis a further toothing with a diameter which, relative to the planetary gear toothing, is reduced. This further toothing meshes with a hollow gear with inner toothing, which is connected stationarily with the housing of the overall motor-gearing combination.

The entire configuration is operated upon actuation of the steering shaft via sensor elements, evaluation electronics and power electronics, such that, corresponding to the actuation of the steering shaft, a power coupling onto the steering shaft takes place and thus a smooth steering action is possible. The configuration provides a highly compact structuring which permits high efficiency and, moreover, can be well cooled with low expenditures. The required ergonomic steering behavior can be realized and, through the compact disk-form implementation, the necessary absorption elements can be optimally realized and installed for the event of a crash.

Figure 3:
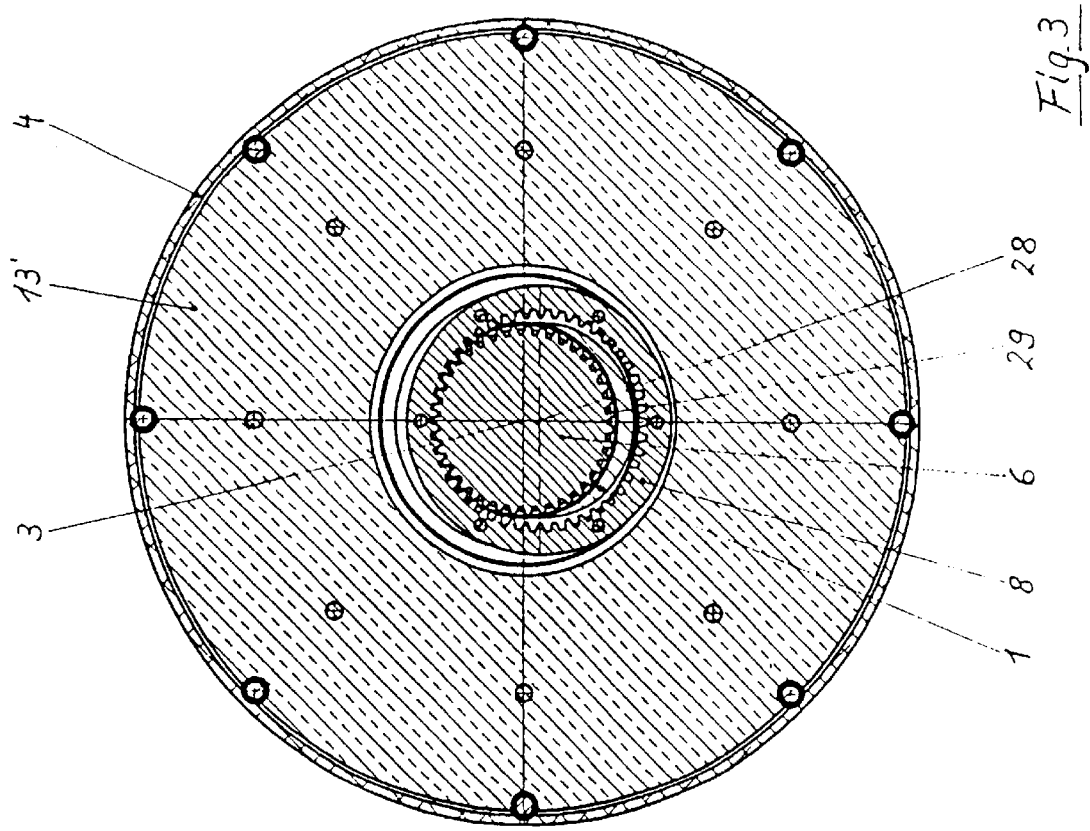
Figure 2:
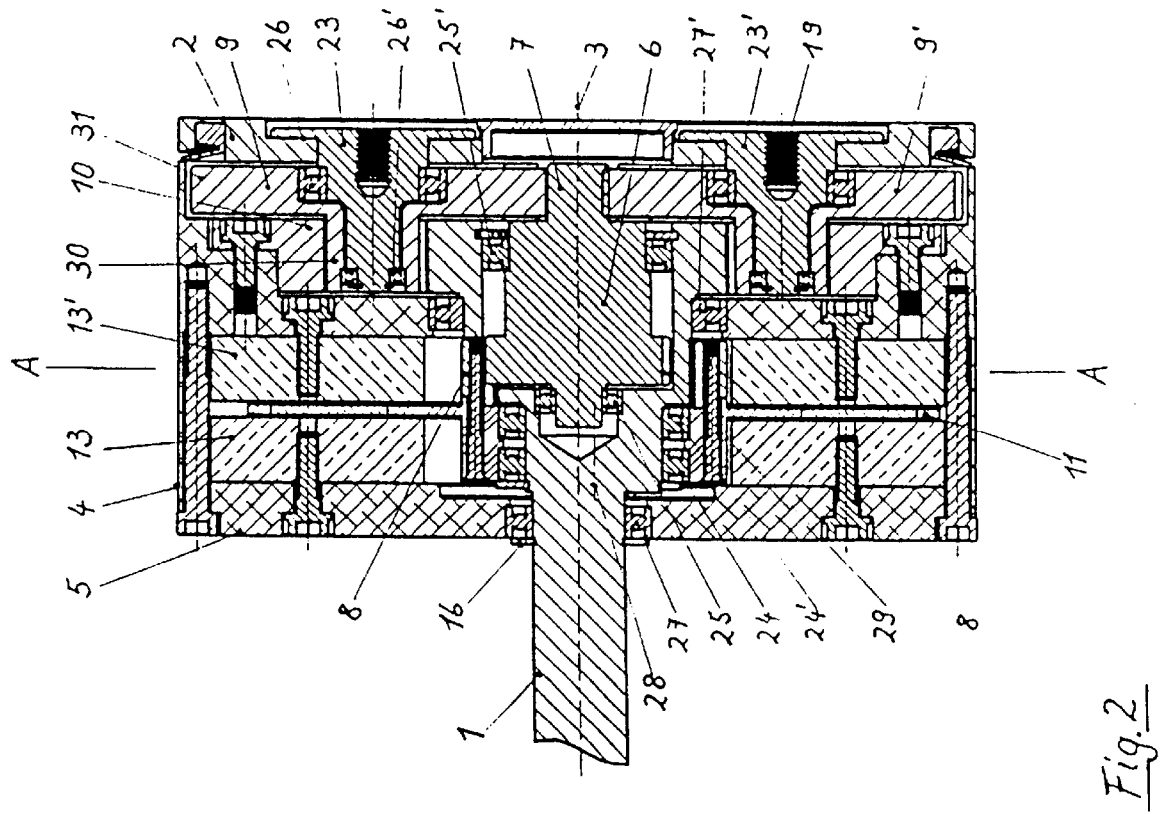

In the following the invention will be explained in further detail by example in conjunction with schematic Figures. Therein depict:

FIG. 1 schematically in three-dimensional representation and sectioned, a configuration according to the invention, FIG. 2 a longitudinal section through the configuration according to the invention, FIG. 3 a cross section of the configuration in the region of a stator winding with power coupling onto the intermediate gear.

The steering shaft 1 with axis 3, which is connected with the steering wheel is rotatably supported in a housing 4 in the region of the housing cover 5 and is rotatably supported, via the bearings 27 and 27', in the region of a stay in the housing. The shaft is widened in the region of the motor-gearing configuration and encompasses an intermediate gear 6, which, within the shaft by bearings 25, 25', is supported rotatably about the center axis 3. On the driven side the shaft 1 has a recess such that planetary gears 9, 9' can radially extend through in the direction of axis 3, in order for their outer toothing 31 to mesh with the toothing of sun gear 7, which is disposed on the intermediate gear shaft 6. At the driven side the shaft 1 is implemented as a planetary gear support 2 and comprises fastening means in order to couple on, in continuation of the shaft axis 3, the driven shaft which is not shown in the Figures. For example, it is also possible to dispose a cardan coupling directly on the driven side in the region of the planetary gear support configuration 2. On planetary gear support 2 are disposed planetary gear axles 23, 23', which receive planetary gear bearings 26, 26', in order to support the planetary gears 9, 9' rotatably about the planetary gear axles 23, 23' disposed parallel to the shaft axis 3.

Apart from the planetary gear outer toothing 31, the planetary gear 9, 9' comprises additionally a further toothing 30, which is implemented in the form of a pinion on the same axis as the planetary gear 9 and with a smaller diameter. This further toothing 30 meshes with an inner toothing of a hollow gear 10, which is stationarily connected with housing 4. Thereby the gearing is stayed on housing 4, which is stationarily connected with the motor vehicle chassis. As stated, in this intermediate gear implementation 6 of the gearing configuration the sun gear 7 can be realized with a very much smaller diameter, which makes possible large reduction ratios in the gearing. For example, a configuration has been implemented in which the steering shaft axle 1 had a diameter of 20 mm and the sun gear a diameter of only 12 mm. The planetary gear had an outer toothing diameter of 77 mm and in the further pinion-form toothing 30 a diameter of 18 mm, wherein the hollow gear had a diameter of 106.5 rhm. Herewith a very large reduction ratio of 1:32 could effortlessly be attained with compact structuring. The motor-gearing combination herein had disk-form housing dimensions with a diameter of 170 mm and an axial length extension of 90 mm.

In order to be able to drive the intermediate gear 6 via the disk armature motor 11, 13, the intermediate gear 6 comprises a further gear rim 29, which is driven by a hollow toothed gear 8 connected with the rotor disk 11 of the motor. The rotor hollow toothed gear 8 herein meshes on one side with the main toothed gear of the intermediate gear shaft 6, as is shown in cross section in FIG. 3. For this purpose it is necessary to parallel offset the rotor axis 28 slightly with respect to the shaft axis 3 by approximately a few millimeters, in said example by approximately 3 mm, whereby the rotor disk 11 with the hollow toothed gear 8 carries out a slightly wobbling movement about the shaft axis 3 during the rotation of the steering shaft. According to the already described example, the rotor hollow toothed gear had a diameter of 46 mm and the main toothed gear 29 of the intermediate gear shaft 6 a diameter of 39 mm. While this configuration generates a slight undesired step-up, it can be neglected relative to the very large reduction ratios in the planetary gearing. In order to be able, as stated, to offset the rotor axis 28, the rotor with bearings 24, 24' is rotatably supported on shaft 1 so as to be offset eccentrically or radially with respect to the shaft axis 3. Rotor 11 comprises permanent magnets, which are driven through the electromagnetic controlled action of force from the stator winding 13, 13'. Preferably on both sides relative to the rotor face 11 are disposed stator windings 13, 13', which are fixed stationarily in housing 4 respectively on housing 5. During the rotation of shaft 1 the rotor wobbles correspondingly about axis 3 without losing the meshing of the power with the intermediate gear shaft 6. In this way, the rotor 11 rotates between the windings 13, 13', on the one hand, about the offset axis 28 and additionally, less rapidly, eccentrically about axis 3. This has the additional advantage that with corresponding dimensioning and overlapping of windings 13, 13' with the magnetic field of the permanent magnets in rotor 11, additionally a compensation of the driving steps of the electronic drive takes place, whereby fewer vibrations of the drive motor act back onto the steering shaft. The various features of novelty which characterize the invention are pointed out with particularity in the claims annexed to and forming a part of this disclosure and are entirely based on the priority Swiss Application No. 1683/98 filed Aug. 15, 1998.

What is claimed is:

1. Steering booster configuration for motor vehicles with a shaft (1) rotatable about a longitudinal axis (3) and, disposed coaxially with respect to it, an electric disk armature motor with a coaxially disposed planetary gearing connected operatively, and which is coupled with shaft (1) stepping up the motor power, characterized in that the motor comprises a rotor disk (11) which is supported on shaft (1) rotatably about an axis (28), offset parallel with respect to axis (3) and wobbling about axis (3), wherein on rotor (11) an also wobbling hollow toothed gear (8) is fastened which acts onto the planetary gearing.

2. Configuration as claimed in claim 1, characterized in that the shaft (1) includes an intermediate shaft gear piece (7) supported rotatably about axis (3) and that at one end the intermediate gear is implemented as a toothed gear (29), which meshes with the eccentrically running hollow toothed gear (8) and at the other end, with smaller diameter, a toothed gear (7) is also implemented and this, as a sun gear (7), drives the planetary gear (26, 26'), provided with a first outer gear rim (31), of the gearing.

3. Configuration as claimed claim 1, characterized in that at least one, preferably two planetary gears (9, 9') are supported (26, 26') on a radial projection of the shaft (1) rotatable about an axle (23, 23') parallel with respect to axis (3).

4. Configuration as claimed in claim 1 characterized in that on the planetary gear (9, 9') a second gear rim (30) is provided with a diameter which, compared to the first gear rim (31), is smaller, which meshes with a housing-stationary hollow toothed gear (10).

5. Configuration as claimed in claim 1, characterized in that the sun gear (7) has a diameter which is maximally the 1.25-fold of the diameter of shaft (1), preferably maximally the same diameter, in particular a smaller diameter, preferably in the range from 10 to 20.

6. Configuration as claimed in claim 1, characterized in that the gearing configuration with the sun gear (7), the planetary gear (9) and the hollow gear (10) forms a reduction of 1:10 to 1:40, preferably at least 1:20, further preferably at least 1:30.

7. Configuration as claimed in claim 1, characterized in that the rotor disk (11) comprises permanent magnets and is disposed radially wobbling between a stator winding (13, 13') disposed stationarily lateral with respect to the rotor disk (11), such that the motor ripple is attenuated during rotation.

* * * * *